United States Patent
Mendez et al.

(10) Patent No.: US 7,917,633 B1
(45) Date of Patent: Mar. 29, 2011

(54) METHOD AND APPARATUS FOR RECONNECTING TO A REMOTE VIEWING SESSION

(75) Inventors: Debby Mendez, Arlington, MA (US);
Ed Hardebeck, Brookline, MA (US);
Richard L. Baker, Belmont, MA (US);
Claudio Topolcic, Concord, MA (US)

(73) Assignee: Glance Networks, Inc., Arlington, MA (US)

( * ) Notice: Subject to any disclaimer, the term of this patent is extended or adjusted under 35 U.S.C. 154(b) by 246 days.

(21) Appl. No.: 12/104,681

(22) Filed: Apr. 17, 2008

Related U.S. Application Data

(60) Provisional application No. 60/923,941, filed on Apr. 17, 2007.

(51) Int. Cl.
*G06F 15/16* (2006.01)
(52) U.S. Cl. .......................................... 709/227; 726/14
(58) Field of Classification Search .................. 709/227, 709/228, 235; 726/14, 15
See application file for complete search history.

(56) References Cited

U.S. PATENT DOCUMENTS

| | | | |
|---|---|---|---|
| 7,117,267 B2 * | 10/2006 | Bavadekar | 709/230 |
| 2004/0157606 A1 * | 8/2004 | Lee | 455/435.1 |
| 2008/0263170 A1 * | 10/2008 | Caron et al. | 709/207 |
| 2009/0027495 A1 * | 1/2009 | Oskin et al. | 348/143 |

* cited by examiner

*Primary Examiner* — Yemane Mesfin
(74) *Attorney, Agent, or Firm* — Anderson Gorecki & Manaras LLP

(57) ABSTRACT

Remote viewing software at a display may contain control logic to enable it to manage the connection associated with a session. The connection management process may preferentially elect to establish a socket connection and, if that is unavailable or unreliable, may use HTTP tunneling. The connection management process may also automatically reconnect the display to the session so that the display is not required to manually re-join an ongoing session. The connection management process also manages the termination of the session to ensure that both the server and the client process at the display end the session correctly.

18 Claims, 3 Drawing Sheets

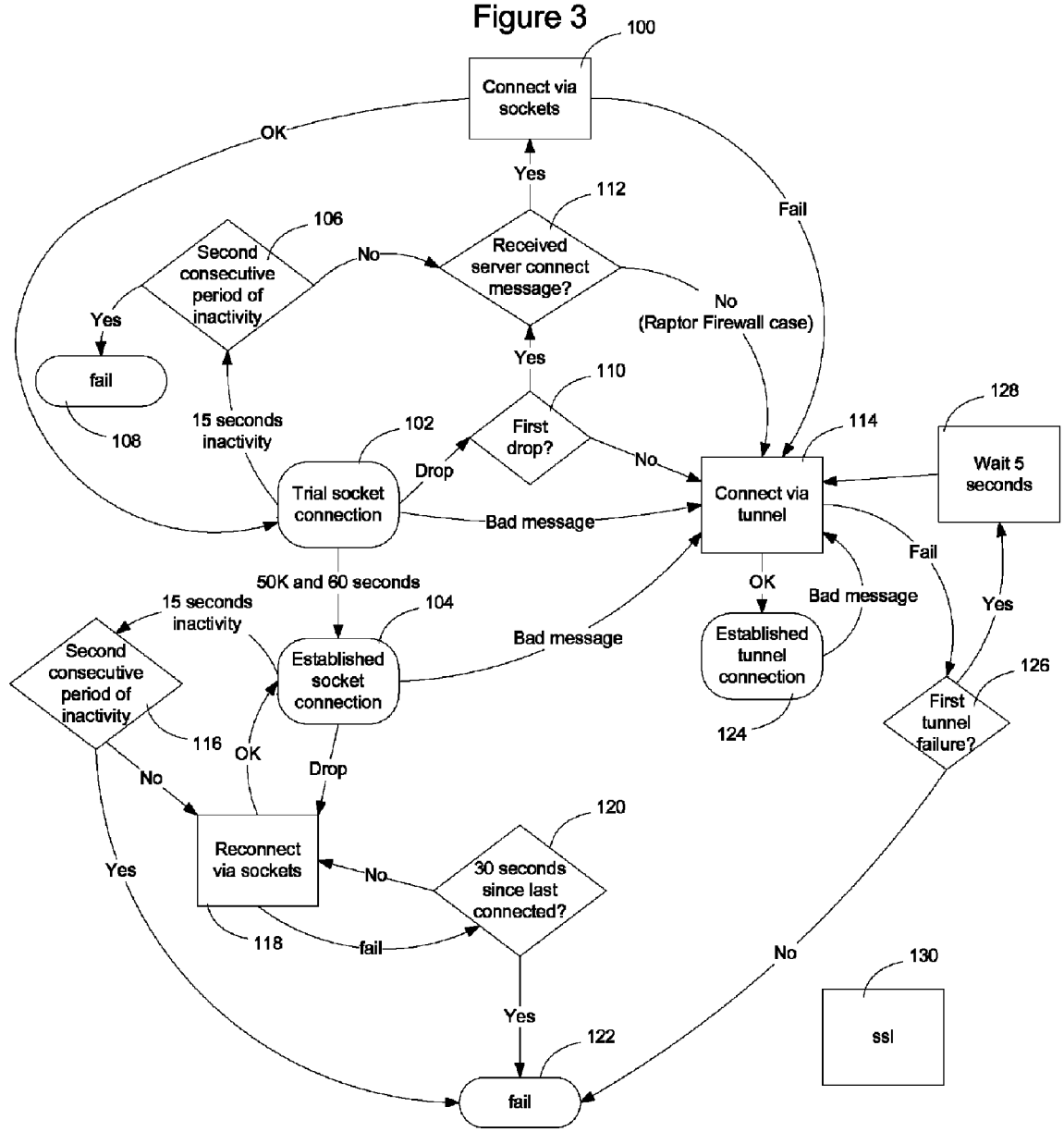

METHOD AND APPARATUS FOR RECONNECTING TO A REMOTE VIEWING SESSION

CROSS-REFERENCE TO RELATED APPLICATIONS

This application claims priority to U.S. Provisional Patent Application No. 60/923,941, filed Apr. 17, 2007, entitled METHOD AND APPARATUS FOR RECONNECTING TO A REMOTE VIEWING SESSION, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form as it appears in the Patent and Trademark Office patent file or records, but otherwise reserves all copyright rights whatsoever.

BACKGROUND

1. Field

The field relates to visual information systems and, more particularly, to a method and apparatus for reconnecting to a remote viewing session which is configured to transmit information shown on one participant's screen to one or more geographically dispersed viewers.

2. Description of the Related Art

Telephones enable people to communicate verbally, but do not enable participants to a telephone call to exchange visual information with each other. Conventionally, when visual information such as a PowerPoint (™ Microsoft Corporation) presentation or a document was to be referenced during a telephone conversation, the visual information would be faxed, e-mailed, or otherwise physically sent to the participants so that the participants could have the reference materials available during the telephone call.

As technology evolved, software was developed to allow information being shown on one computer screen (display information), such as a computer monitor screen, to be made visible on another person's computer screen at a geographically dispersed location. Software of this nature will be referred to herein as "Remote Viewing Software" (RVS).

FIG. 1 illustrates an example of a typical way in which remote viewing of one person's screen information may take place using a RVS system. As shown in FIG. 1, a first participant 10 may desire to allow information 12 appearing on a their screen 14 and associated with a their machine 16, to be made available to another person 18 at a remote location. To do so, RVS software 20 on the display machine 16 will capture the screen information 12 and pass it over a network 22 to the viewer's machine 24. An instantiation of the RVS software 26 (which may be the same as RVS software 20 or a different i.e. limited version of RVS software 20) will decode the received screen information to reproduce the screen information 12 as viewer screen information 28 that will be caused to appear on the viewer's display screen 30. A remote viewing service 32 may be provided to support viewing sessions on the network. A combination of the display machine 16 and display screen 14 will collectively be referred to herein as a "display" 34, since their information is being "displayed" to the viewers on the RVS session. The display machine 16 and display screen 14 may be separate devices or integrally formed. Similarly, a combination of a viewer's machine 24 and screen 30 will collectively be referred to herein as a "viewer" 36 since this is the entity that will receive the host screen information to be "viewed" on the session. The viewer's machine and screen, like the display, may be separate devices or integrally formed.

By looking at the recreated screen information 28 on the viewer's screen 30, the viewer 18 may thus see a reproduction of the screen information 12. A remote viewing session over which the display screen information is transmitted may be hosted by the display machine 16 or, optionally, the remote viewing service 32 may assume a portion of the tasks required to host the session.

When the system of FIG. 1 is in use, the display participant may cause a desired visual presentation to appear on the viewer's screen 30 simply by causing the desired visual presentation to appear as part of the screen information on the display screen. Since the participant 10 is able to control the display and, hence, the content that is shown on the display screen, the participant 10 may control the content that is made to appear on the viewer's screen. Reference may then be made to the shared information to enable more effective communication to take place between the participants.

Remote Viewing Software (RVS) tools vary significantly in their complexity. For example, some RVS tools require all participants to have special purpose RVS software installed on their machines, firewalls custom configured to enable traffic to pass over the networks, and require extensive training. Other RVS tools are much simpler to use, such as the RVS tool developed by Glance Networks™. Occasionally, due to network or other conditions, an established remote viewing session may be dropped or otherwise compromised. Accordingly, it may be desirable to allow the viewers and displays to reconnect to an established remote viewing session.

SUMMARY

Remote viewing software at a viewer may contain control logic to enable it to manage the connection associated with a session. The connection management process may preferentially elect to establish a Transport Control Protocol (TCP) socket connection and, if that is unavailable or unreliable, may use Hypertext Transfer Protocol (HTTP) tunneling. The connection management process may also automatically reconnect the viewer or display to the session so that the participant is not required to manually re-join an ongoing session. The connection management process also manages the termination of the session to ensure that both the process at the server and the process at the viewer or display end the session correctly.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 illustrates a process of enabling a user to reconnect to a host session according to an embodiment of the invention.

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Overview of an Example RVS Systems

One example of a remote viewing system will be described initially to explain in greater detail an environment in which the invention may be implemented. The invention is not limited to implementation in this particular described remote viewing system, however, as aspects of the invention may be used in many different systems and in other types of software unrelated to remote viewing. Additionally, although the invention will be described as being implemented in software, hardware components may be used to implement embodiments of the invention as well, or particular portions of the disclosed invention, and the invention is thus not limited to a software implementation.

Additional details about how aspects of an example system may operate are available in several related U.S. Patent Applications, the content of each of which is hereby incorporated by reference. Specifically, capturing and encoding host screen information for transfer over a session is described in greater detail in U.S. patent application Ser. No. 11/355,852, filed Feb. 16, 2006, entitled METHOD AND APPARATUS FOR THE IDENTIFICATION AND SELECTIVE ENCODING OF CHANGED HOST DISPLAY INFORMATION, the content of which is hereby incorporated herein by reference. A transmission protocol configured to allow sessions to be established, terminated, and used by participants is described in greater detail in U.S. patent application Ser. No. 11/355,741, filed Feb. 16, 2006, entitled METHOD AND APPARATUS FOR THE TRANSMISSION OF CHANGED HOST DISPLAY INFORMATION, the content of which is hereby incorporated herein by reference. Techniques for allowing displays with different bandwidth or network conditions to view the same session are described in greater detail in U.S. patent application Ser. No. 11/355,740, filed Feb. 16, 2006, entitled METHOD AND APPARATUS FOR REDUCING THE AMOUNT OF INFORMATION THAT MUST BE TRANSMITTED TO SLOWER DISPLAYS OVER A REMOTE VIEWING SESSION, and U.S. patent application Ser. No. 12/061,011, filed Apr. 2, 2008, entitled METHOD AND APPARATUS FOR SELECTING COMMANDS FOR TRANSMISSION FROM AN UPDATE QUEUE, the content of each of which is hereby incorporated herein by reference.

Figure 1:
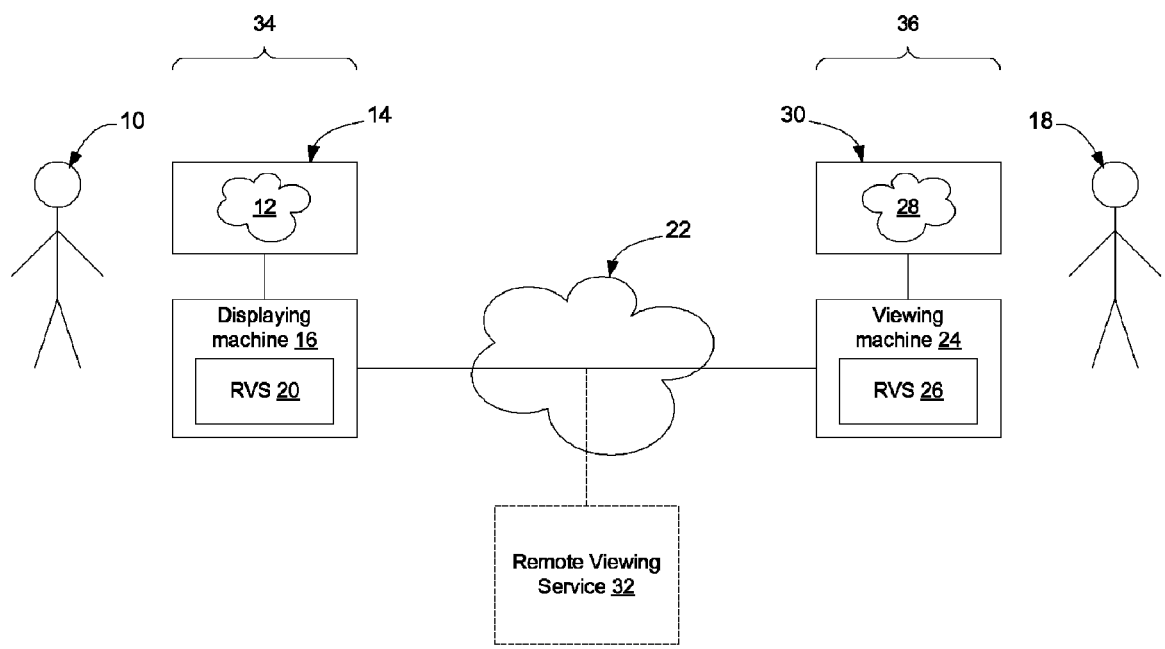
FIG. 1 is a functional block diagram illustrating the participants to a remote viewing session.
Figure 2:
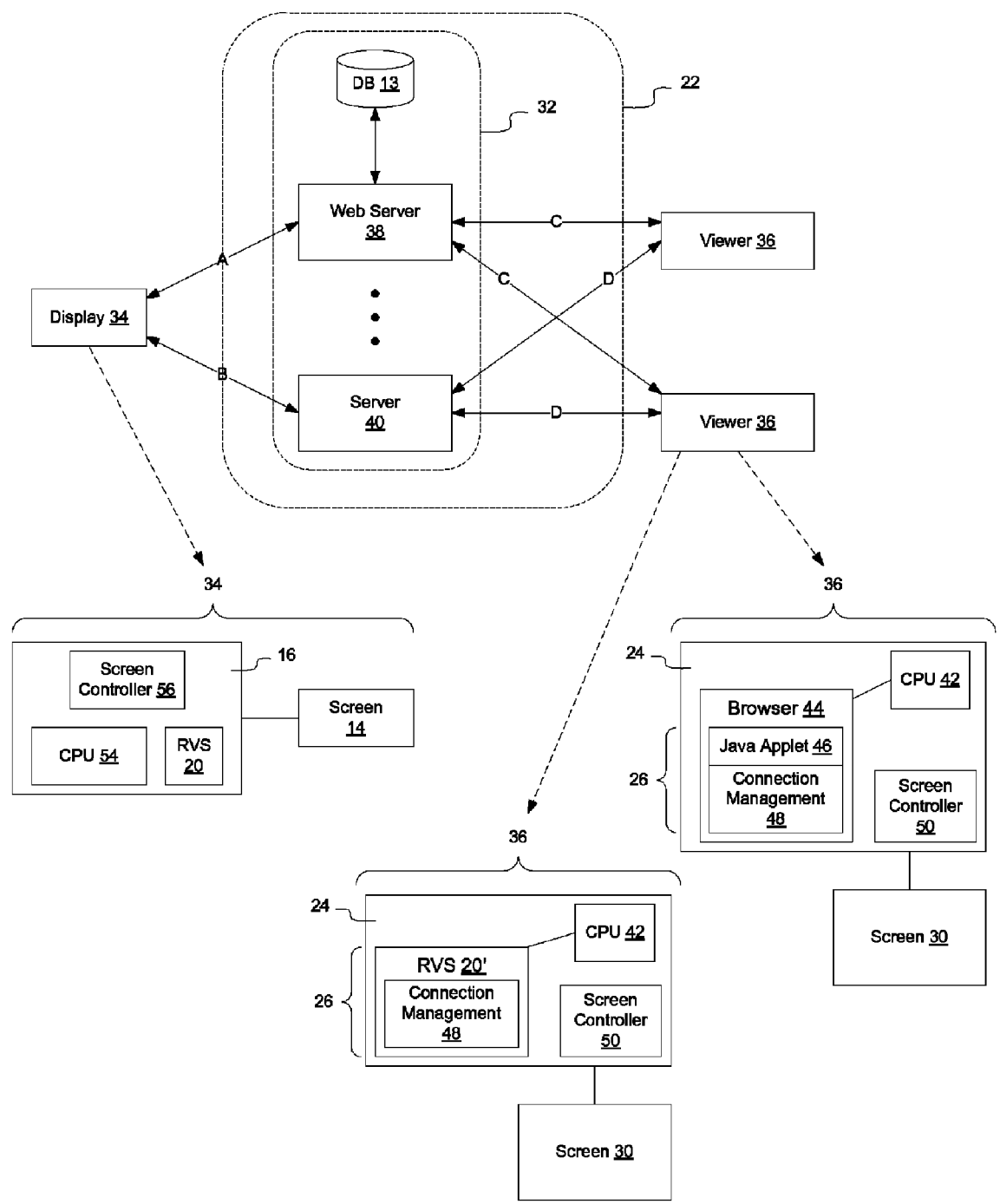
FIG. 2 is a functional block diagram illustrating a network environment that may be used to exchange screen information to be displayed.

FIG. 1, described briefly above, illustrates the basic interconnection of the display 34 and viewer 36 to enable remote viewing of the display screen information 12 on the viewer screen 30. FIG. 2 illustrates an example of an implementation in which the remote viewing service 32 is used to perform several of the display functions to thereby facilitate the creation of, and use of, remote viewing sessions over the network. As shown in FIG. 2, the display 34 and viewers 36 may be connected over the Internet or other network infrastructure 22 to enable sessions to be established, so that viewers 36 may be provided with a representation of the display screen information 12. FIG. 2 will be used to describe aspects of operation of the remote viewing service, however the invention is not limited to use in connection with a system such as that shown in FIG. 2, as that system is shown as only one example of a possible system that may be utilized in connection with an embodiment of the invention.

The remote viewing service 32, in this example, includes one or more servers 38, 40 configured to provide an environment over which remote viewing sessions may occur. For example, in the illustrated embodiment, the remote viewing service 32 has a web server 38 configured to provide an environment in which web pages may be created for display 34, and through which viewers 36 can connect to RVS sessions associated with the displays 34. Once the RVS session has been established, data transfer between the displays 34 and the viewers 36 may be supported by the web server 38 or by another server 40 associated with the remote viewing service 32. The remote viewing service 32 may be architected in many different ways depending on the expected number of sessions, the expected location of participants, and level of involvement of the service, and whether the remote viewing service is to be deployed on a public network such as the Internet or is to be deployed in a more controlled environment such as a private network.

A viewer 36 may access a session using a viewer machine 24 such as a computer or another access device having a CPU 42 configured to provide an environment to support execution of a browser 44 such as an Internet browser. To enable session information to be decoded and reassembled by the viewer machine 24, a Remote Viewing System (RVS) client 26, which may be implemented for example as a Java Applet 46, may be instantiated in the viewer's machine 24 to be executed in connection with in the viewer's browser 44. The RVS client 26 may take many forms. For example, optionally, the RVS software 20' implemented on the viewer's machine 24 may be an instance of the RVS software 20 that is utilized by the display 34 to create a session. In this embodiment, the viewer 36 may access the content associated with a session directly using a decoder built into the RVS software 20'.

The RVS software 26 may be pre-installed on the viewer machine or downloaded and installed to the viewer machine automatically when the viewer 36 connects to a session so that the viewer participant 18 need not manually install software to obtain access to the session. Information received over a session will be decoded by the RVS software 26 and used in connection with a screen controller 50 such as a video driver to cause a representation of the display screen information 12 to appear on the viewer's screen 30.

On the display side, a display 34 generally includes a display screen 14 that is electronically controlled via a display machine 16, which may be a computer or other electronic device. The display machine 16 generally includes a CPU 54 configured to control a display driver 56 to allow selected information that is generated in the display machine 16 to be shown on the screen 14. An instance of RVS software 20 is also instantiated on the display machine 16 to allow information displayed on the screen 14 to be identified and selectively encoded, optionally for transmission over a session being supported by the remote viewing service 32.

The connection between the viewer and the server for the session will be managed by a connection management component 48 of the RVS software 26. When a session is started, connection management module 48 monitors the connection and attempts to find a way to establish a connection that is capable of carrying the session. For example, as discussed in greater detail below, the connection management component may first attempt to establish a TCP socket and, if unsuccessful, may attempt to use HTTP tunneling to carry the session.

The connection management component may also monitor the connection and attempt to reconnect when a failure on the connection occurs. Additional details of how the connection may be established by the viewer 36 (and re-established if necessary) are described below in connection with FIG. 3.

To create a session, the RVS software 20 on the display is invoked. Where the session is to be supported by the remote viewing service 32, the RVS software 20 will contact the remote viewing service 32 to establish the session. For example, the RVS software 20 will communicate with one of the web servers 38 associated with the remote viewing service 32 to initiate a session (Arrow A). Session initiation may include authentication, establishing authorization with the server, and setting up accounting entries for the session. Encryption parameters may also be negotiated at this stage. For example, SSL may be used to encrypt the session traffic.

Once the display 34 has completed the session initiation process with the server 38, a passcode for the session will be generated (either automatically by the server or in connection with host input). The passcode will be used to allow viewers 36 to join the session and to prevent unauthorized viewers from accessing the session. Multiple forms of session access control may be used and the invention is not limited to the use of any particular form of session access control. During the session, the display 34 will transmit updates of the display screen information to the server(s) (Arrow B) which will then be made available to the viewers 36 over the session. The same server may be used to perform session initiation and to support the session, or alternatively, as illustrated, different servers 38, 40 may be used.

To join a session, a viewer 36 communicates with the display 34 e.g. via e-mail, telephone, or instant messaging, and obtains the access information associated with the session. For example, the access information may be a Uniform Resource Locator (URL) associated with the web site that will be used to support the session and which may be used by the browser 44 to locate the session on the network 22, and a passcode that was generated during the initiation process discussed above. The viewer 36 then can use its browser 44 to locate the URL on the network, enter the passcode to authenticate with the remote viewing service 32, and connect to the session (Arrow C).

During a session, screen information from the display is captured and transmitted to the viewers 36 via the remote viewing service 32 that is hosting the session (Arrow D). The RVS software 26 on the viewer's machine contains a codec that is used to decode the information received over the session. The content received over the session may be used to cause a representation of the display screen information to be recreated on the viewer screen 30.

Connect/Reconnect Process

FIG. 3 illustrates a flow chart of a process that may be used by a display or viewer to connect to a session. The process may be implemented by a connection management module 48 which is implemented as part of the RVS software 20, 26. As shown in FIG. 3, initially the RVS software on the display or viewer's machine will attempt to connect to a session via a TCP socket (100). If the display/viewer is able to connect via a socket, the socket connection will enter a trial period (102). If the display/viewer receives 50 KB of data and stays connected for 60 seconds, the trial will be considered to be successful and the display/viewer will determine that a TCP socket has been established (104). If there are two connection drops, or if a "bad" message is received within the first 60 seconds or before the display/viewer receives 50 KB of data, then the RVS software 26 will switch to tunneling over HTTP.

These values may be adjusted as necessary, and the invention is not tied to an implementation that uses these exact values.

If there is a period of 15 seconds of inactivity during the trial socket connection period (102), a second attempt will be made to connect via sockets. After a second consecutive period of inactivity (106), the connection will be deemed to have failed (108).

If the socket connection is dropped during the trial socket connection (102), the display/viewer will determine if the socket has been dropped for the first time (110). If the trial socket was dropped for the first time, and the display/viewer has received a server connect message (112), the display/viewer will attempt via sockets a second time (100). If the display/viewer has not received the server connect message, as in the Raptor Firewall case, the display/viewer will attempt to connect via an HTTP tunnel (114). The display/viewer will also attempt to connect via a HTTP tunnel if the connection via sockets fails at (100), if the trial socket connection is dropped more than once (110), or if the trial socket connection receives a "bad" message. A "bad" message is one which is truncated early, has a length greater than the expected message length, or contains other out-of-bounds values.

Once the trial period has been completed, i.e. once 50 KB of data have been received and at least 60 seconds have elapsed, if there is a 15 second period of inactivity, the display/viewer will determine if the period of inactivity is the first such period (116). If the inactivity period is the first such period, the display/viewer will attempt to reconnect via sockets (118). The display/viewer will also attempt to reconnect via sockets (118) where the original established socket connection is dropped. If the display/viewer is able to reconnect via sockets, the display/viewer reverts to monitoring the established socket connection at (104).

If the attempt to reconnect using sockets fails, the display/viewer will continue to attempt to reconnect using sockets for 30 seconds (120). If it has been 30 seconds since the display was last connected (120) the connection will be deemed to have failed (122). Similarly, if the established socket experiences two consecutive 15 second periods of inactivity (116) the connection will be deemed to have failed (122).

If the display/viewer switches over to attempting to connect via a HTTP tunnel (114) and a tunnel is established (124), the tunnel will be used to carry information on the session. If a bad message is received, the display/viewer will attempt to reconnect using an HTTP tunnel.

If the attempt to connect via a HTTP tunnel fails, the display/viewer will determine whether the failure is the first failure (126). If it is the first failure, the display/viewer will wait 5 seconds (128) and again attempt to reconnect using an HTTP tunnel. After the first failure, a subsequent failure will be deemed to be a permanent failure and the display/viewer will be deemed to have failed (122).

Optionally, in connection with establishing a connection, Secure Socket Layer (SSL) (130) may be used to protect the data to be transmitted on the connection. SSL is a well known protocol and, accordingly, additional details associated with how SSL may be used in connection with an embodiment of the invention will not be provided in greater detail.

To enable the reconnect process described above to function properly, the display/viewer and the server should both be able to distinguish an intentionally closed connection from an unintentionally dropped connection. A dropped connection is one where the connection is detected to be closed before a CloseMessage has been sent. Thus, it is important for close messages to get through when either side intentionally closes a connection. According to one embodiment, if any party sends a close message to intentionally close a connection, that side must wait for the close message to get through before closing the connection (socket or tunnel) on the initiating side.

Close Initiated by Display or Viewer

A close message from the display/viewer is acknowledged by the server by closing the socket (non-tunneling) and returning empty response—SendEmptyResponse (tunneling). Prior to this feature, in the non-tunneling case, the display/viewer would have immediately closed the display/viewer side connection after sending the message without waiting for acknowledgement, possibly preventing the close message from going through. Now, after sending a close message, the display/viewer waits for either the socket close or empty response on the tunnel. Then the display/viewer closes the socket or, in the tunnel case, closes the tunnel by sending a close indicator in the form of a message with seqNum=0. Note that for a tunneling connection, the server normally does not close the tunnel first (that may lead to a viewer-side hang and/or abnormal entries in the logs). If the display/viewer times out waiting for the server to acknowledge the close message, it then goes ahead and closes the connection on its side.

Close Initiated by Server

The server sends a close message to all display/viewer connections to initiate a close when a session is ending. A close message from the server is acknowledged by the display/viewer closing the socket/tunnel connection. Prior to this feature, the server would close the server side socket connection immediately after sending the close, sometimes preventing the close messages from reaching the viewers. Now, after sending a close message, the server will wait to read on the connection to look for acknowledgement by the display and viewers. The display/viewers acknowledge the close message by closing the socket when operating using sockets (non-tunneling mode). At the server, when this occurs, the connection becomes readable but the server will get a "connection closed" error when it attempts to read from it, and it will then close the connection on the server side. When a display/viewer is operating in tunneling mode, the display/viewer will send a close indicator on the tunnel. At the server side, the server closes the connection upon receipt of the close indicator.

It would be advantageous to make sure that regardless of the viewer's behavior, the connection is cleaned up in a timely manner on the server side. Thus, if the viewer hangs before acknowledging the close, the connection will timeout on the server side in TimeoutInactiveConnections. There is a shorter inactivity timeout, ClosedConnTimeout, for a connection already in a closing state, vs. the normal DeadConnTimeout. Also, if the viewer crashes before acknowledging the close, then in the socket case the connection will be broken anyway and the server will get the "connection closed" error and clean up the server side connection. In the tunneling case, the server connection will time out in ClosedConnTimeout seconds. These various time periods are configurable and able to be set by an administrator.

Session Ending Process and Deferred Close Messages

Another server side issue that may occur is the deferred close case. Previously, the session ending process completed synchronously, with a close message going out to all connections when the session was slated for deletion. Sometimes the server was in the middle of sending some other message on a connection, and "deferred" the close message to a later time—only there wasn't any later time because the session was destroyed. Now the session ending process is asynchronous. When a session needs to be ended, close messages are sent out on all connections as before, but the session is put into an "ending calls" list. The session remains in the ending calls list long enough for deferred close messages to be sent and for close messages to be acknowledged. The ending calls list can be viewed via the administrators user interface. As the close message is acknowledged on each connection, the connection disconnects from the session. Only when the last connection disconnects is the session slated for deletion.

Connection Drop and Reconnect

If the server detects a connection drop, the connection state is set to CONN_WAITING_RECONNECT. If the display does not reconnect within a configurable time period (DroppedConnTimeout), the connection is closed on the server side, ending the session.

If the display reconnects to the server, it is matched up to the existing session by the server according to the session id. If the viewer reconnects, the server will match the viewer to the session by session id and to the existing (waiting reconnect) display connection by viewer ID. The new connection takes the place of the WAITING_RECONNECT connection in the session, and the old WAITING_RECONNECT connection is removed from the server.

Display

If the display connection drops, any messages from viewers already queued for the display are discarded. While in CONN_WAITING_RECONNECT state, no new messages (update requests, remote control messages from viewers) are queued for the display. When the display reconnects, the entire display connection handshake is repeated because a) it might not have completed the first time and b) this will keep the state machine simpler on the display side. When the display sends the EncodingParamDataMessage which completes the connection process, the server will request a full update from the display. If pruning, the full update request is always sent immediately. If not pruning, then the full update request is sent if/when all viewers are ready, or if the connection had dropped before an end of update was received from the display.

Viewer

A viewer will request a full update upon reconnection to a session to ensure that the viewer has a current version of the display screen information. This is accomplished by having the viewer and server undergo the normal connection handshake process, which will cause a complete set of display screen information to be transmitted to the viewer. If pruning is enabled, the complete set of display screen information is only required to be transmitted to the reconnecting viewer since different information may be transmitted to different viewers at different rates. If pruning is not enabled, however, this will cause the server to send a full update request to the display, so that the full update may be provided to the reconnecting viewer (and hence also to each of the other viewers).

Remote Control

In some versions of the RVS software 26, the viewer may assume control of the session to direct what information appears on the viewer screen. In this case, the RVS software 26 at the viewer allows the viewer to control the operation of the display machine. If remote control is enabled, it must be disabled temporarily while the display is disconnected. When the display connection drops, a message is sent to all viewers disabling remote control, and an enable remote control message is then sent when the display reconnects. If remote control is enabled and the viewer which has control is disconnected, the remote control events generated while the viewer is disconnected will not be queued for transmission to the server. Rather, while disconnected, the viewer shows the "control suspended" cursor and suspends collection of control messages.

Backward Compatibility

Older versions of the RVS software 26 may not have reconnect ability, and the server should not wait for them to reconnect. When a connection drops, if the version of the RVS software 26 indicates that the viewer does not support auto-reconnect, the server will not put the connection into a WAITING_RECONNECT state even where the server is capable of supporting automatic reconnection by viewers. Instead, since the server has determined that the viewer is not capable of automatically reconnecting, i.e. from the RVS software version number, it will instead close the connection immediately and require the viewer to manually rejoin the session.

There may also be instances where an older version of the software on the server does not enable the server to handle automatic reconnection processes. In this instance, the viewer should not attempt to reconnect to the server using the auto-reconnect process described herein but rather terminate the connection and attempt to re-establish a new connection for the session with the server.

To enable the viewer and the server to learn the capabilities of the other component, the version of the build instantiated on the viewer and on the server may be exchanged when the viewer first connects to the server. In that way, if one or the other does not support auto-reconnect, the automatic reconnection process may be avoided.

The methods described herein may be implemented as software configured to be executed in the control logic such as contained in a CPU of an electronic device such as a computer. In particular, the RVS software or portions of the RVS software may be implemented as a set of program instructions that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It also should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

We claim:

1. A method of connecting to a remote viewing session being hosted to enable host screen information to be viewed remotely on a display screen, the method comprising the steps of:

attempting to establish a Transport Control Protocol (TCP) socket connection for the session, wherein the step of attempting to establish a TCP socket includes the steps of establishing a trial socket during a trial socket connection period and monitoring the trial socket for both a period of time and for a quantity of data to ensure that the trial TCP socket is operating adequately and, if the attempt to establish the TCP socket connection is unsuccessful or if the resultant TCP socket connection is unreliable, attempting to establish a Hypertext Transfer Protocol (HTTP) tunneling connection for the session, wherein the trial TCP socket will be deemed to have failed if, during the trial socket connection period, the connection is dropped more than once.

2. The method of claim 1, wherein the trial TCP socket will be deemed to have failed if, during the trial socket connection period, a bad message is received, the bad message being a message that is truncated early or has a length greater than expected.

3. The method of claim 1, wherein if a HTTP tunnel is established, and there is a first HTTP tunnel failure, the method comprising the further step of attempting to reconnect the HTTP tunnel.

4. The method of claim 1, further comprising the step of deeming the socket connection to be reliable upon successful expiration of the trial socket connection period.

5. The method of claim 4, further comprising the step of automatically attempting to reconnect the TCP socket if the connection is dropped.

6. The method of claim 5, wherein the step of automatically attempting to reconnect the TCP socket will persist for a pre-configured period of time, and upon expiration of the pre-configured period of time, the TCP connection will be deemed to have failed.

7. The method of claim 5, wherein the step of automatically attempting to reconnect the TCP socket will occur after a given period of inactivity, the period of inactivity being a period of time when the TCP connection is established but no data is received on the connection.

8. The method of claim 7, wherein upon occurrence of a second consecutive period of inactivity, the TCP socket will be deemed to have failed.

9. The method of claim 1, further comprising monitoring the TCP connection or HTTP tunnel once established to enable an automatic reconnection process to be used to re-establish the TCP connection or HTTP tunnel upon failure.

10. The method of claim 9, further comprising the step of distinguishing whether the failure was a result of an intentionally closed connection or an unintentionally dropped connection, and only enabling the automatic reconnection process to be used in the event of an unintentionally dropped connection.

11. The method of claim 1, further comprising the step of establishing a TCP socket connection for the remote viewing session.

12. The method of claim 11, further comprising generating a close message by a display to instruct a server to close the TCP socket connection, and acknowledging the close message by the server by closing the TCP socket at the server prior to terminating the TCP socket at the display.

13. The method of claim 11, further comprising generating a close message by a server to instruct a display to close the TCP socket connection, and acknowledging the close message by the display by closing the TCP socket at the display prior to terminating the TCP socket connection at the server.

14. The method of claim 1, further comprising the step of establishing a HTTP tunneling connection for the remote viewing session.

15. The method of claim 14, comprising generating a close message by a display to instruct a server to close the HTTP tunneling connection, and acknowledging the close message by the server prior to terminating the HTTP tunneling connection.

16. The method of claim 14, comprising generating a close message by a server to instruct a display to close the HTTP tunneling connection, and acknowledging the close message by the display prior to terminating the HTTP tunneling connection.

17. The method of claim 1, further comprising the step of maintaining a list of connections that are active at a server, and a list of connections that are in a process of being terminated.

18. The method of claim 17, wherein when a connection is to be terminated, it is passed from the list of connections that are active at the server to the list of connections that are in the process of being terminated to allow messages related to the organized termination of the connection to be passed over the connection before the connection is closed.

* * * * *